(12) United States Patent  (10) Patent No.: US 6,454,645 B1
Baba et al.  (45) Date of Patent: Sep. 24, 2002

(54) AIR CONDITIONER OUTLET VENT DEVICE

(75) Inventors: Hideki Baba, Gunma (JP); Yutaka Ishida, Gunma (JP); Takashi Koike, Gunma (JP); Junichi Higuchi, Gunma (JP); Akira Tabuchi, Tokushima (JP); Yozaburo Tsujikawa, Tokushima (JP)

(73) Assignees: Moriroku Kabushiki Kaisha, Tokyo (JP); Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 09/942,033

(22) Filed: Aug. 30, 2001

(30) Foreign Application Priority Data

Aug. 30, 2000 (JP) ........................................ 2000-265988

(51) Int. Cl.⁷ ................................................. B60H 1/34
(52) U.S. Cl. ........................................ 454/155; 264/242
(58) Field of Search ................................. 454/155, 202, 454/313, 314, 315, 318, 319, 320, 321; 264/242, 250

(56) References Cited

U.S. PATENT DOCUMENTS 4,414,170 A * 11/1983 Sano ........................... 264/242
4,546,695 A * 10/1985 Ouchi et al. ................. 264/242
4,853,909 A * 8/1989 Shoji et al. .................. 368/190
5,340,357 A * 8/1994 Nagai et al. ................. 454/155

FOREIGN PATENT DOCUMENTS

JP  10-82554  3/1998

* cited by examiner

*Primary Examiner*—Harold Joyce
(74) *Attorney, Agent, or Firm*—Arent Fox Kintner Plotkin & Kahn, PLLC

(57) ABSTRACT

An air conditioner outlet vent device in which one of a blade and a housing is molded as a primary molding having a shaft hole by primary injection using a first synthetic resin, the other is molded, within a secondary mold die where the primary molding has been set, as a secondary molding having a support shaft by secondary injection using a second synthetic resin so that the shaft hole and the support shaft are fitted together at the same time as they are molded, thereby enabling the blade to pivot within the housing. The first and second synthetic resins are of the same synthetic resin system, and an additive for suppressing shrinkage in cooling and solidifying it after injection molding is added to the first synthetic resin so that the percentage mold shrinkage of the shaft hole becomes smaller than that of the support shaft.

6 Claims, 4 Drawing Sheets

AIR CONDITIONER OUTLET VENT DEVICE

BACKGROUND OF THE INVENTION

1. Field of the Invention

The present invention relates to an air conditioner outlet vent device that is mounted in an instrument panel of an automobile, etc. and, in particular, to an improvement in an air conditioner outlet vent device in which either one of a blade or a housing that surrounds the blade is molded as a primary molding having a shaft hole by primary injection using a first synthetic resin, the other one of the blade or the housing is molded within a secondary mold die, in which the primary molding has been set, as a secondary molding having a support shaft corresponding to the above-mentioned shaft hole by secondary injection using a second synthetic resin so that the shaft hole and the support shaft are fitted together at the same time as they are molded, and being so fitted together the blade can pivot within the housing.

2. Description of the Related Art

Such an air conditioner outlet vent device is already known as disclosed in, for example, Japanese Patent Application Laid-open No. 10-82554, in which a housing with shaft holes is formed by primary molding and blades with support shafts are formed by secondary molding.

In this conventional device, with regard to the materials forming the housing and the blade, in order to avoid melt-bonding between the housing and the blade during secondary molding, they are made from different synthetic resin materials that are chosen so that the secondary injection material has a melting point lower than that of the primary injection material (for example, an ABS resin for the housing and a polypropylene resin for the blade).

Furthermore, in this conventional device, taking into consideration the thermal deformation of the blade, in order to prevent the blade from dropping out due to its shrinkage, an surplus shaft section which protrudes from the housing is provided on the support shaft of the blade.

However, as in the above-mentioned conventional device, when materials of different systems are used for the housing and the blade, a step of separating the housing and the blade is required for recycling. Taking into consideration the cost and labor of this step, it is difficult to recycle the material in practice.

If, taking recycling into consideration, materials of the same system are used for the housing and the blade, the percentage mold shrinkage of the shaft hole and that of the support shaft become approximately equal, and there are the problems that the support shaft comes into close contact with the shaft hole thus melt-bonding the two and it is difficult to adjust the feeling given by pivoting of the blade.

In particular, in the structure in which an surplus shaft section is provided on the blade support shaft in order to prevent the blade from dropping out due to its shrinkage, the surplus shaft section protrudes from the housing. In particular, in an outlet vent device of a type in which the air is directed by pivoting the housing itself relative to a fixed support, there are the problems that the surplus shaft section might obstruct the pivoting of the housing and degrade the appearance by being exposed to the passenger compartment when pivoting the housing.

SUMMARY OF THE INVENTION

The present invention has been carried out in view of the above-mentioned circumstances, and it is a main object of the present invention to provide an air conditioner outlet vent device in which even when, taking recycling into consideration, a housing and a blade are made from materials of the same system, the percentage mold shrinkage of the shaft hole can be made smaller than that of the support shaft by a simple arrangement so as to avoid melt-bonding between the shaft hole and the support shaft, and the feeling given by pivoting of the blade can easily be adjusted.

In order to achieve the above-mentioned object, in accordance with a first aspect of the present invention, there is proposed an air conditioner outlet vent device in which one of a blade and a housing that surrounds the blade is molded as a primary molding having a shaft hole by primary injection using a first synthetic resin, the other of the blade and the housing is molded, within a secondary mold die where the primary molding has been set, as a secondary molding having a support shaft corresponding to the shaft hole by secondary injection using a second synthetic resin so that the shaft hole and the support shaft are fitted together at the same time as they are molded, thereby enabling the blade to pivot within the housing, wherein: the first and second synthetic resins are of the same synthetic resin system, and an additive for suppressing shrinkage of the primary molding in cooling and solidifying it after injection molding is added to the first synthetic resin so that the percentage mold shrinkage of the shaft hole becomes smaller than that of the support shaft. In accordance with the above-mentioned proposed arrangement, even when, taking recycling into consideration, the housing and the blade are made from materials of the same system, the percentage mold shrinkage of the shaft hole can be made smaller than that of the support shaft by the simple arrangement of merely adding the above-mentioned additive to the first synthetic resin used for the primary injection. Therefore, it is possible to effectively prevent melt-bonding between the shaft hole and the support shaft and, moreover, by merely controlling the amount of the above-mentioned additive, the feeling given by pivoting of the blade can easily be adjusted.

Furthermore, in accordance with a second aspect of the present invention, there is proposed an air conditioner outlet vent device in which one of a blade and a housing that surrounds the blade is molded as a primary molding having a shaft hole by primary injection using a first synthetic resin, the other of the blade and the housing is molded, within a secondary mold die where the primary molding has been set, as a secondary molding having a support shaft corresponding to the shaft hole by secondary injection using a second synthetic resin so that the shaft hole and the support shaft are fitted together at the same time as they are molded, thereby enabling the blade to pivot within the housing, wherein: the first and second synthetic resins are of the same synthetic resin system, an additive for suppressing shrinkage of the primary and secondary moldings in cooling and solidifying them after injection molding is added to each of the first and second synthetic resins at different ratios of the amounts of the additive added to the two synthetic resins so that the percentage mold shrinkage of the shaft hole becomes smaller than that of the support shaft. In accordance with the above-mentioned proposed arrangement, even when, taking recycling into consideration, the housing and the blade are made from materials of the same system, the percentage mold shrinkage of the shaft hole can be made smaller than that of the support shaft by a simple arrangement of merely changing the ratio of the amounts of additive added to the first synthetic resin used for the primary injection and the second synthetic resin used for the secondary injection. Therefore, it is possible to effectively prevent melt-bonding between the shaft hole and the support shaft. Moreover, since the percentage mold shrinkage of the shaft hole and the support shaft can be changed individually by adding the additive to the two synthetic resins, the feeling given by pivoting of the blade can yet more easily be adjusted.

Furthermore, in accordance with a third aspect of the present invention, in addition to the second aspect, there is proposed an air conditioner outlet vent device wherein the primary molding is the housing, the secondary molding is the blade, and the support shaft formed on the blade does not protrude from the housing. In accordance with the above-mentioned proposed arrangement, the appearance of the device is improved and its size is decreased. Therefore, even when this arrangement is applied to an outlet vent device of, for example, the type in which air is directed by pivoting the housing itself relative to a fixed support frame, there is no possibility that the support shaft might interfere with the pivoting of the housing or the support shaft might be exposed to a passenger compartment when pivoting the housing, thus degrading its appearance. Moreover, since the mold shrinkage of the blade can be controlled to an appropriate level by adding the above-mentioned additive to the blade, it is possible to effectively prevent the support shaft from dropping out of the shaft hole without making the support shaft protrude from the housing.

Furthermore, in accordance with a fourth aspect of the present invention, in addition to the above-mentioned first, second or third aspect, there is proposed an air conditioner outlet vent device wherein one of the first and second synthetic resins is polyethylene and the other is polypropylene. In accordance with the above-mentioned proposed arrangement, when selecting materials for the housing and the blade, since a combination of polyethylene and polypropylene which are general as recycling materials, can be employed, recycling becomes extremely easy.

Furthermore, in accordance with a fifth aspect of the present invention, in addition to the above-mentioned first, second or third aspect, there is proposed an air conditioner outlet vent device wherein the above-mentioned additive has a function of enhancing the heat resistance of the molding. In accordance with a sixth aspect of the present invention, in addition to the above-mentioned fourth aspect, there is proposed an air conditioner outlet vent device wherein the above-mentioned additive has a function of enhancing the heat resistance of the molding. In accordance with the above-mentioned proposed arrangements, since the heat resistance of the molding to which the additive is added is enhanced, a comparatively inexpensive synthetic resin material having low heat resistance can be chosen as a material for the molding, thus reducing the unit cost of the product. For example, when the molding is a blade that is required to have heat resistance, a comparatively inexpensive synthetic resin material having low heat resistance can be chosen as a blade material, thus reducing the unit cost of the blade.

The 'percentage mold shrinkage' referred to in the present invention denotes the percentage of the change due to actual shrinkage of the molding based on reference dimensions obtained on the assumption that the molding did not shrink at all on cooling and solidifying after injection molding. The smaller the percentage mold shrinkage, the smaller the degree of shrinkage, that is to say, it is described as being difficult to shrink.

The above-mentioned objects, other objects, characteristics and advantages of the present invention will become apparent from explanations of preferred embodiments that will be described in detail below by reference to the attached drawings.

BRIEF DESCRIPTION OF THE DRAWINGS

FIG. 1 is a partially cutaway perspective view of an air conditioner outlet vent device.

FIG. 2 is a cross section at line 2—2 in FIG. 1.

FIG. 3 is a diagram for explaining the molding of a blade by secondary injection.

DESCRIPTION OF PREFERRED EMBODIMENTS

The first embodiment of the present invention is explained by reference to FIGS. 1 to 3.

Figure 1:
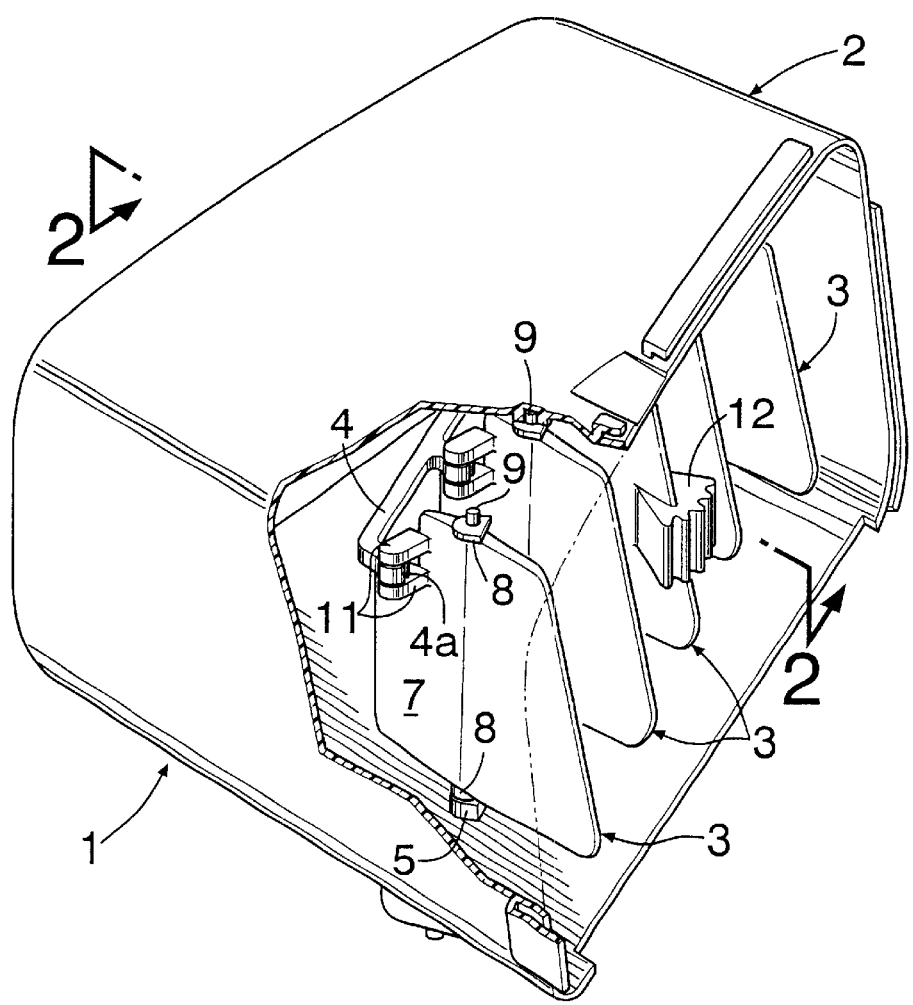
FIGS. 1 to 3 illustrate a first embodiment of the present invention.

In FIG. 1, 1 denotes an air conditioner outlet vent device for an automobile of the first embodiment. The air conditioner outlet vent device 1 has a cylindrical housing 2 molded by primary injection using a first synthetic resin (e.g. a polypropylene resin) and a large number of blades 3 molded by secondary injection within the housing 2, using a second synthetic resin (e.g. a polyethylene resin) that is of the same system as that of the first synthetic resin, so as to be arranged side by side. After the secondary injection molding, all the blades 3 are linked to each other by a single link 4. The housing 2 is secured to a fixed support such as an instrument panel for an automobile (not illustrated), an air supply duct (not illustrated) is connected to the left-hand end in FIGS. 1 and 2, and air flows in the direction of arrow A.

Figure 2:
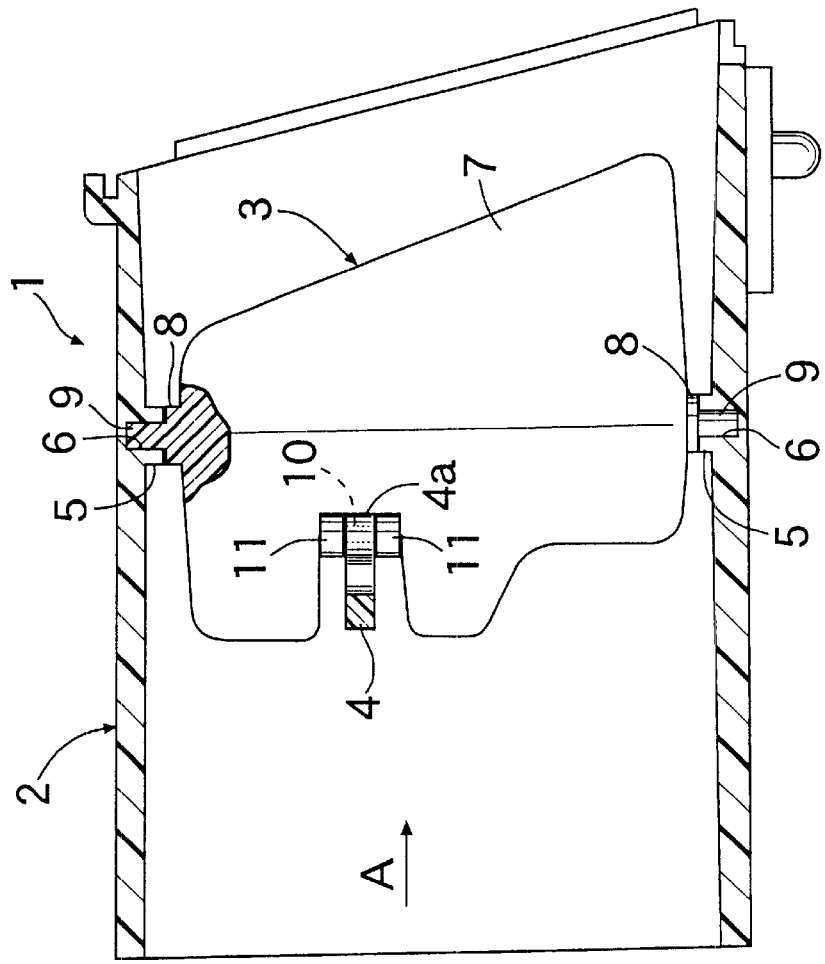

As shown in FIGS. 1 and 2, when molding the housing 2, the same number of vertical pairs of bosses 5 as the number of blades 3 are formed on the upper and lower walls of the housing 2, and the bosses are arranged in the lateral direction in such a manner that their inner ends protrude from the inner surfaces of the housing 2. Each vertical pair of bosses 5 have coaxial shaft holes 6. These shaft holes 6 are formed as blind holes in the illustrated example, and the support shafts 9 which will be described below and fit into the shaft holes 6, do not therefore protrude from the housing 2.

Each of the blades 3 has a blade main body 7 and a pair of upper and lower support shafts 9 provided integrally on the upper and lower ends of the blade main body 7 so as to project therefrom. These support shafts 9 fit into the corresponding shaft holes 6 in a pivotable and slidable manner, which enables the blades 3 to pivot within the housing 2. A flange 8 having a larger size than the thickness of the blade main body 7 is formed integrally in a seamless manner on each of the base ends of the support shafts 9, the base ends facing inside the housing 2, so as to face and contact the inner end of the corresponding boss 5.

Furthermore, a pair of arms 11 which are connected to each other via a connecting pin 10 are projectingly provided on one side of the rear end, opposite to the air flow direction A relative to the support shaft 9, of the blade main body 7. A knob 12 is also formed on the forward end, in the air flow direction A, of the main body 7 of one of the blades.

When molding the large number of blades 3 having the above-mentioned structure, the housing 2 is molded beforehand by primary injection using a first synthetic resin in a housing molding die (not illustrated).

Figure 3:
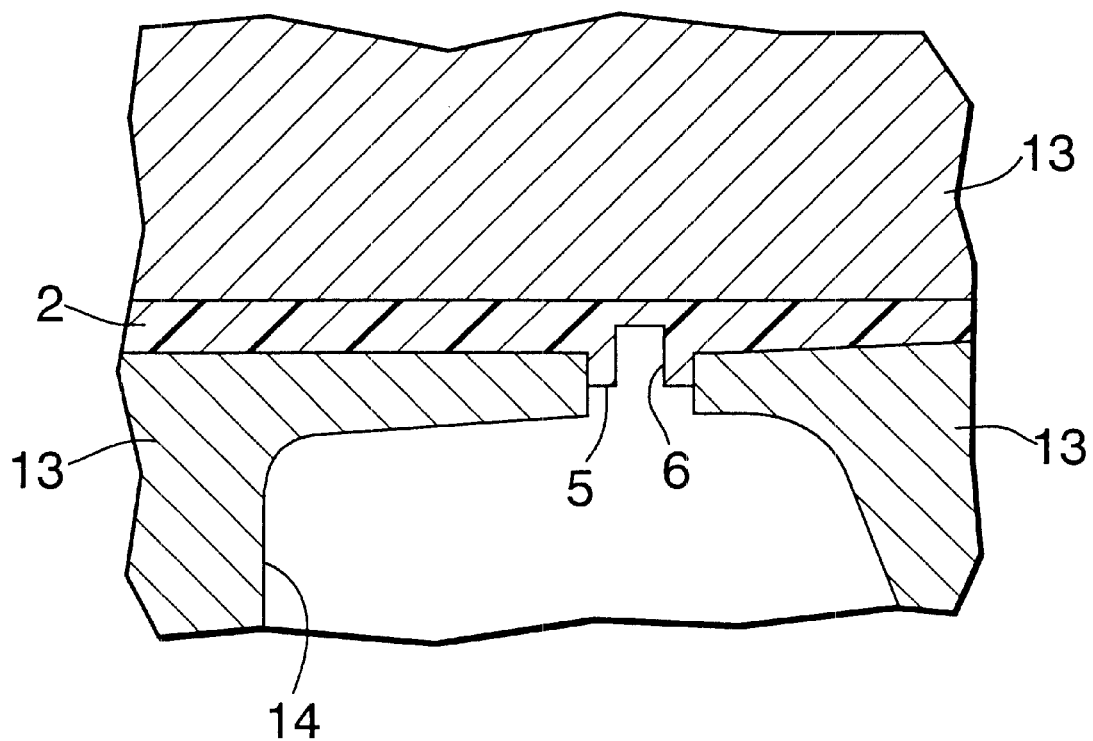

Next, the thus-molded housing 2 is placed in a blade molding die 13 as shown in FIG. 3 so that the shaft holes 6 and the inner end surfaces of the bosses 5 face a cavity 14 within the die 13. A second synthetic resin is then injected so as to fill the cavity 14. The secondary injection is thus completed, all the blades 3 are formed in a single step, and the shaft holes 6 and the support shafts 9 are fitted together at the same time as the molding. After cooling, the die 13 is opened and the housing 2 is removed from the die 13 together with the blades 3.

Subsequently, a large number of C-shaped elastic connectors 4a formed integrally with the link 4 are elastically engaged with the corresponding connecting pins 10 of the blades 3 so as to link all the blades 3 to each other. By laterally swinging the single knob 12 with a fingertip, all the blades 3 can thus be pivoted in the lateral direction around their respective support shafts 9, thereby adjusting the direction in which air is blown out of the housing 2.

In this first embodiment, as the mold materials for the housing 2 and the blade 3, materials of the same system that are general recycling materials, that is to say, a polypropylene resin and a polyethylene resin, are used in combination, which makes recycling extremely easy.

In this first mode of the first embodiment, an additive for suppressing the shrinkage of a molding when cooled and solidified after injection molding is added only to the first synthetic resin (e.g. a polypropylene resin) for primary injection, and the percentage mold shrinkage of the primary injection molding (i.e. the shaft hole 6) is thus made smaller than that of the secondary injection molding (i.e. the support shaft 9). Therefore, in cooling and solidifying the resin after secondary molding, since the percentage shrinkage of the support shaft 9 is larger than that of the shaft hole 6, there is no possibility that the shaft hole 6 might excessively constrict the support shaft 9, and unnecessarily high surface pressure is not caused between the shaft hole 6 and the support shaft 9. It is therefore possible to effectively prevent melt-bonding between the shaft hole 6 and the support shaft 9. Moreover, by merely controlling the amount of the above-mentioned additive added to the first synthetic resin, the frictional torque working between the shaft hole 6 and the support shaft 9 and consequently the feeling given by pivoting (resistance to pivoting) of the blade 3 can easily be adjusted, whereby the blade 3 can thus be maintained at an intended position.

With regard to the above-mentioned additive, any material can be used as long as it exhibits an effect of suppressing the above-mentioned shrinkage on cooling and solidifying, when added to a synthetic resin. For example, at least one material chosen among talc, glass fiber, potassium titanate, calcium silicate, etc. can be used as appropriate. Furthermore, a material such as potassium whose physical properties are not degraded when it is recycled, titanate fiber, is preferably used as the above-mentioned additive.

In particular, with regard to potassium titanate, that having the form of short fibers is preferred, since the addition thereof to a synthetic resin can enhance the heat resistance of the molding, thus increasing its heat resistant temperature. It is therefore advantageous in satisfying the requirements for heat resistance in an air conditioner outlet vent device. Furthermore, addition of potassium titanate can improve the appearance of the molding, and results in an advantage of enhancing the salability of the device. In particular, when such a potassium titanate is added to a resin used for forming the blade 3, an effect of enhancing the rigidity of the blade 3 can be exhibited, the blade main body 7 can be made thinner, and reductions in the weight and the cost and an increase in the outlet vent opening area can thus be achieved.

In a second mode of the first embodiment, the above-mentioned additive is added not only to the first synthetic resin (e.g. a polypropylene resin) used for the primary injection, but also to the second synthetic resin (e.g. a polyethylene resin) used for the secondary injection. By changing the ratio of the amounts of the additive added to the two synthetic resins, the percentage mold shrinkage of the primary molding (i.e. the shaft hole 6) is made smaller than that of the secondary molding (i.e. the support shaft 9). As in the above-mentioned first mode, in cooling and solidifying the resin after secondary molding, the percentage shrinkage of the support shaft 9 becomes larger than that of the shaft hole 6, leading to no possibility that the shaft hole 6 might excessively constrict the support shaft 9, thereby effectively preventing melt-bonding between the shaft hole 6 and the support shaft 9.

Moreover, since the percentage mold shrinkage of the shaft hole 6 and that of the support shaft 9 can be changed individually by adding the additive to the two synthetic resins, the feeling given by pivoting of the blade 3 can be adjusted yet more easily. When adjusting this feeling, for example, the amount of additive that can satisfy the heat resistance requirement for the blade 3 is first determined and an amount α is added to the resin therefor The amount of the additive used for the housing 2 that is expected to give the best feeling upon pivoting the blade is then determined. By changing the amount +α a of additive used for the blade 3, the feeling given by pivoting can be finely adjusted. The feeling given by pivoting can thereby be adjusted without adjusting the amount of additive used for the housing 2 which has a structure in which it is joined to another part (that is to say, without changing the shrinkage (dimensions) of the housing 2).

In the above-mentioned first embodiment, the primary molding corresponds to the housing 2 and the secondary molding corresponds to the blade 3. Since the support shaft 9 formed on the blade 3 does not protrude (is not exposed) from the housing 2, the appearance of the device is improved and its size is decreased. In this case, if the above-mentioned additive is also added to the blade 3 as is the case of the above-mentioned second mode, since the mold shrinkage of the blade 3 can be controlled and suppressed appropriately, it is possible to effectively prevent the support shaft 9 from dropping out of the shaft hole 6 without making the support shaft 9 protrude from the housing 2.

In particular, when the above-mentioned potassium titanate is added as the additive to the blade 3 which is required to have heat resistance, even if a comparatively inexpensive synthetic resin material having low heat resistance is chosen as a material for forming the blade 3, the heat resistance required for the blade 3 can be obtained and the unit cost of the product can be reduced.

Figure 4:
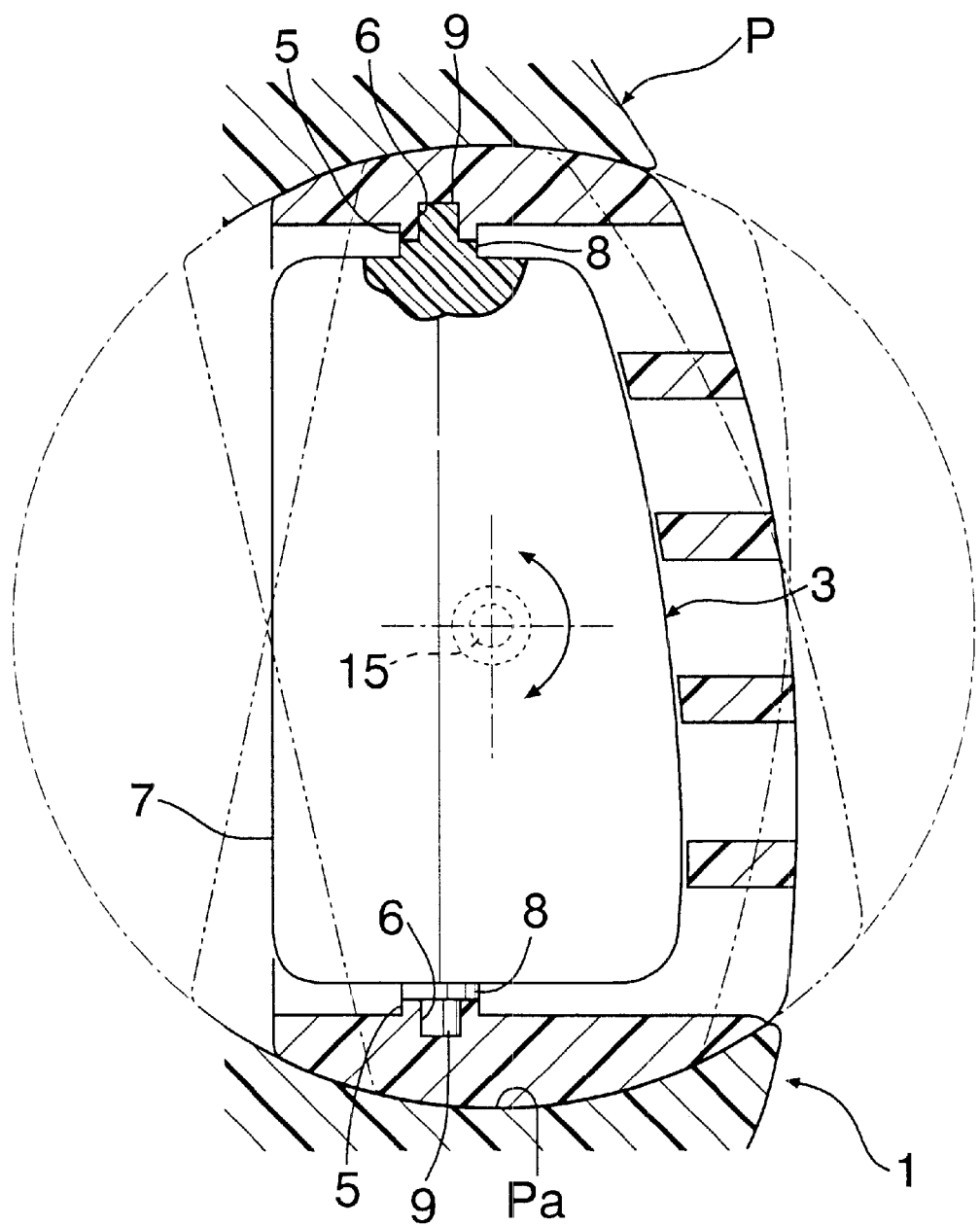
FIG. 4 is a cross section corresponding to FIG. 2 regarding a second embodiment of the present invention.

FIG. 4 illustrates a second embodiment of the present invention. In this embodiment, the invention is applied to an outlet vent device of the type in which air is directed by supporting a housing 2 itself around a pivot shaft 15 in a pivotable manner relative to a fixed support such as, for example, an instrument panel P of an automobile. The above-mentioned pivot shaft 15 is placed approximately perpendicular to the support shaft 9, and the housing 2 can be maintained at a required position by the frictional torque working on the pivoting movement support as is the case of the blade 3. A hole Pa for receiving the housing 2 in the instrument panel P is formed with a circular surface that has its center on the above-mentioned pivot shaft 15. The outer surface of the housing 2 is also formed with a circular surface approximately following the hole Pa. Since the other structures of the housing 2 and the blade 3 are basically the same as those in the first embodiment, the reference numerals and symbols of the main parts corresponding to the first embodiment are only shown and their explanation is omitted.

Also in the second embodiment, the support shafts 9 do not protrude from the housing 2. Therefore, there is no possibility that the support shafts 9 interfere with pivoting of the housing 2 around the pivot shaft 15, or the support shafts 9 are exposed to a passenger compartment upon pivoting of the housing 2 to degrade its appearance.

In the above-mentioned embodiments, the housing 2 is chosen as the primary molding having the shaft hole 6, the blade 3 is chosen as the secondary molding having the support shaft 9, and after the housing is formed by primary molding, the blades 3 are formed by secondary molding. However, in the present invention (the first and second aspects), a blade can be formed as a primary molded article having a shaft hole by primary injection using a first synthetic resin, and a housing can be formed as a secondary molded article having a support shaft by secondary injection using a second synthetic resin.

Furthermore, in the above-mentioned embodiments, the shaft hole 6 is a blind hole, but in the present invention the shaft hole 6 can be formed as a through hole, and in this case the length of the support shaft 9 is set so as not to protrude from the shaft hole 6.

Furthermore, in the above-mentioned embodiments, with regard to resins of the same system used for forming the blade and the housing, olefin system resins, that is to say, homopolymers of olefin compounds (those represented by the general formula $C_nH_{2n}$ and having one double bond (ethylene bond) such as ethylene, propylene or butylene) are used. However, in the present invention, two types of resin of the same system that is different from the olefin system such as, for example, the styrene system, amide system and PET system may be used in appropriate combinations. In addition, among combinations of resins that can be recycled as a mixture, combinations of systems such as a combination of polyethylene (olefin system) and polystyrene (styrene system) that cannot be said to belong to the same system in a strict sense are treated as the 'same system' in a broad sense and may be used in the present invention.

Although embodiments of the present invention have been explained above, the present invention is not limited by the above-mentioned embodiments and can be modified in a variety of ways.

What is claimed is:

1. An air conditioner outlet vent device in which one of a blade and a housing that surrounds the blade is molded as a primary molding having a shaft hole by primary injection using a first synthetic resin, the other of the blade and the housing is molded, within a secondary mold die where the primary molding has been set, as a secondary molding having a support shaft corresponding to the shaft hole by secondary injection using a second synthetic resin so that the shaft hole and the support shaft are fitted together at the same time as they are molded, thereby enabling the blade to pivot within the housing, wherein:

the first and second synthetic resins are of the same synthetic resin system, and an additive for suppressing shrinkage of the primary molding in cooling and solidifying it after injection molding is added to the first synthetic resin so that the percentage mold shrinkage of the shaft hole becomes smaller than that of the support shaft.

2. An air conditioner outlet vent device in which one of a blade and a housing that surrounds the blade is molded as a primary molding having a shaft hole by primary injection using a first synthetic resin, the other of the blade and the housing is molded, within a secondary mold die where the primary molding has been set, as a secondary molding having a support shaft corresponding to the shaft hole by secondary injection using a second synthetic resin so that the shaft hole and the support shaft are fitted together at the same time as they are molded, thereby enabling the blade to pivot within the housing, wherein:

the first and second synthetic resins are of the same synthetic resin system, an additive for suppressing shrinkage of the primary and secondary moldings in cooling and solidifying them after injection molding is added to each of the first and second synthetic resins at different ratios of the amounts of the additive added to the two synthetic resins so that the percentage mold shrinkage of the shaft hole becomes smaller than that of the support shaft.

3. The air conditioner outlet vent device according to claim 2 wherein the primary molding is the housing, the secondary molding is the blade, and the support shaft formed on the blade does not protrude from the housing.

4. The air conditioner outlet vent device according to any one of claims 1 to 3 wherein one of the first and second synthetic resins is polyethylene and the other is polypropylene.

5. The air conditioner outlet vent device according to any one of claims 1–2 wherein the additive has a function of enhancing the heat resistance of the molding.

6. The air conditioner outlet vent device according to claim 4 wherein the additive has a function of enhancing the heat resistance of the molding.

* * * * *